United States Patent
Yonetani

(10) Patent No.: US 11,525,784 B2
(45) Date of Patent: Dec. 13, 2022

(54) IDENTIFICATION APPARATUS

(71) Applicant: CANON KABUSHIKI KAISHA, Tokyo (JP)

(72) Inventor: Yuki Yonetani, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/504,136

(22) Filed: Oct. 18, 2021

(65) Prior Publication Data

US 2022/0128476 A1   Apr. 28, 2022

(30) Foreign Application Priority Data

Oct. 28, 2020 (JP) .............................. JP2020-180169

(51) Int. Cl.
*G01J 3/44* (2006.01)
*G01N 21/65* (2006.01)
*G01J 3/02* (2006.01)

(52) U.S. Cl.
CPC ................ *G01N 21/65* (2013.01); *G01J 3/02* (2013.01); *G01J 3/44* (2013.01); *G01N 2201/06113* (2013.01); *G01N 2201/08* (2013.01)

(58) Field of Classification Search
CPC ......... G01N 21/65; G01N 2201/06113; G01N 2201/08; G01J 2003/2836; G01J 3/0218; G01J 3/28; G01J 3/02; G01J 3/18; G01J 3/2803; G01J 3/2823; G01J 3/44
See application file for complete search history.

(56) References Cited

U.S. PATENT DOCUMENTS

| | | | |
|---|---|---|---|
| 5,559,597 A | 9/1996 | Battey | |
| 5,638,173 A | 6/1997 | Smith | |
| 6,256,436 B1 | 7/2001 | Nakama | |
| 9,232,158 B2 * | 1/2016 | Olsen | ................... G02B 3/0062 |

(Continued)

FOREIGN PATENT DOCUMENTS

JP      2019105628 A      6/2019

OTHER PUBLICATIONS

B.A. Capron, et al.; "Design and Performance of a Multiple Element Slab Waveguide Spectrograph of Multimode Fiber-Optic WDM Systems;" Journal of Lightwave Technology, vol. 11; No. 12; Dec. 1993; pp. 2009-2014.

(Continued)

*Primary Examiner* — Abdullahi Nur
(74) *Attorney, Agent, or Firm* — Canon U.S.A., Inc. IP Division

(57) ABSTRACT

An identification apparatus 1000 includes a light collecting unit 20 configured to collect scattered light from a sample, spectroscopic elements 150*l* and 150*h* configured to disperse light from the light collecting unit 20, an imaging unit 170 that includes a plurality of light detection elements arrayed in a row direction 172*r* and a column direction 172*c* and to which optical spectra from the spectroscopic elements 150*l* and 150*h* are projected along the row direction 172*r*, and an acquisition unit 30 configured to acquire spectral information about the sample based on an output signal from the imaging unit 170. The optical spectra corresponding to the sample are projected to the imaging unit 170 discontinuously in at least one of the row direction 172*r* and the column direction 172*c*.

15 Claims, 7 Drawing Sheets

(56) References Cited

U.S. PATENT DOCUMENTS

| | | | |
|---|---|---|---|
| 2014/0029004 A1* | 1/2014 | Bodkin | G01J 3/36 |
| | | | 356/328 |
| 2015/0294076 A1 | 10/2015 | Treado | |
| 2017/0227467 A1 | 8/2017 | Smith | |
| 2018/0136043 A1 | 5/2018 | Arnold | |
| 2020/0003618 A1 | 1/2020 | Fujita | |
| 2020/0292389 A1 | 9/2020 | Yonetani | |

OTHER PUBLICATIONS

Akihiro Tsuchida et al.; "Identification and Degradation Estimation of Waste Plastics for Recycling Using Raman Spectroscopy;" Bunseki Kagaku vol. 61, No. 12, pp. 1027-1032 (2012; © 2012 The Japan Society for Analytical Chemistry.

* cited by examiner

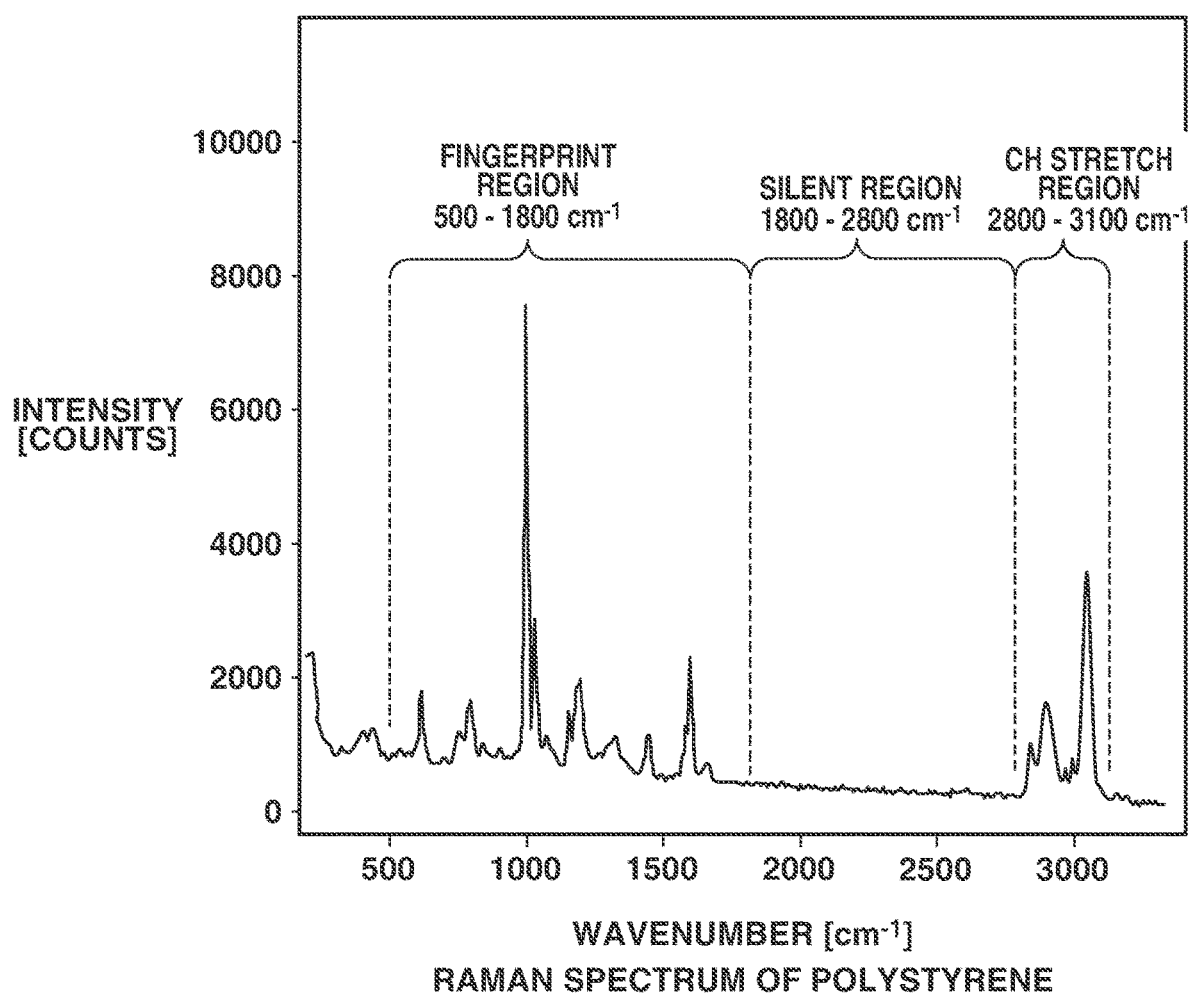

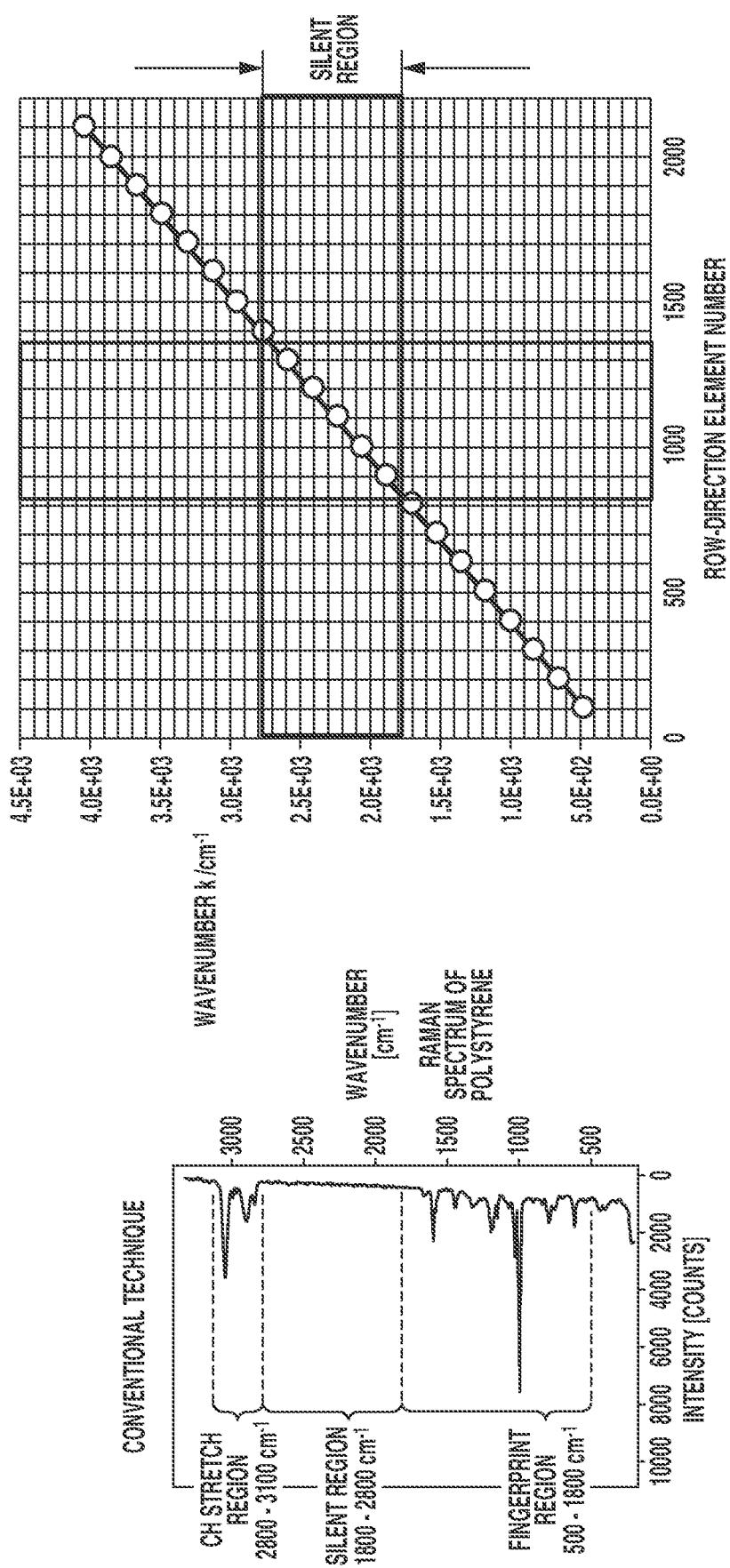

IDENTIFICATION APPARATUS

BACKGROUND OF THE INVENTION

Field of the Invention

The present invention relates to an identification apparatus that identifies properties such as a composition and constituents of a sample based on scattered light from the sample.

Description of the Related Art

An identification apparatus that optically identifies properties of a sample using spectroscopic analysis is known. Such an identification apparatus is installed in a conveyance path for conveying a plurality of samples and is used to inspect products and to sort wastes.

Spectroscopic analysis does not always require processes, such as vacuum decompression, atmosphere control, immersion in liquid, and atmosphere management for drying that limit the throughput, and properties of a sample can be identified under an atmospheric atmosphere. Thus, attempts to apply the spectroscopic analysis to the sorting of waste resins have been made in recent years.

Known types of spectroscopic analysis are infrared absorption spectroscopy and Raman scattering spectroscopy. Infrared absorption spectroscopy acquires an absorption spectrum of a sample with respect to incident light containing an infrared wavelength band. Raman scattering spectroscopy acquires a scattering spectrum of a sample with respect to incident light containing an ultraviolet wavelength band. Raman scattering spectroscopy is less likely to be affected by light attenuation due to the thickness of the sample and is therefore used in identifying wastes of different sample sizes. A Raman scattering spectroscopic method of dispersing Raman scattered light uses Raman shifts specific to atomic bonds constituting a hydrocarbon and is therefore suitable for use in identifying a resin.

The intensity of Raman scattered light is lower by several orders of magnitude than elastic scattered components (Rayleigh scattered light) contained in secondary light, so that a method of converging primary light and irradiating a sample with the converged light is employed to increase the detection sensitivity per unit area. There is a known sorting apparatus that sorts samples into a target sample and others based on whether a predetermined target condition is satisfied based on a detected spectrum.

BUNSEKI-KAGAKU Vol. 61, No. 12, pp. 1027-1032 (2012) discusses a waste resin identification apparatus including a light collecting unit, a spectroscopic element, and a charge-coupled device (CCD) image sensor having 1024-by-64 (row direction by column direction) elements arrayed in a two-dimensional matrix. The identification apparatus discussed in BUNSEKI-KAGAKU Vol. 61, No. 12, pp. 1027-1032 (2012) projects an optical spectrum from the spectroscopic element along a lengthwise direction (row direction) of the CCD image sensor. BUNSEKI-KAGAKU Vol. 61, No. 12, pp. 1027-1032 (2012) further discusses acquisition of a spectral image at high speed by reading an optical spectrum projected from the spectroscopic element in the column direction. Japanese Patent Application Laid-Open No. 2019-105628 discusses an identification apparatus including a plurality of light collecting units, a spectroscopic element, and a two-dimensional imaging unit. The identification apparatus discussed in Japanese Patent Application Laid-Open No. 2019-105628 is reduced in size by consolidating apparatuses following the plurality of light collecting units into a single spectroscopic element and a single two-dimensional imaging unit. The identification apparatus discussed in Japanese Patent Application Laid-Open No. 2019-105628 uses a rolling shutter complementary metal oxide semiconductor (CMOS) image sensor as the two-dimensional imaging unit to reduce interaction between spectral images projected in parallel in a column direction.

The identification apparatuses discussed in BUNSEKI-KAGAKU Vol. 61, No. 12, pp. 1027-1032 (2012) and Japanese Patent Application Laid-Open No. 2019-105628 are limited in spectral resolution in the wavenumber direction by the resolution of the spectroscopic element and the number of projection pixels on the two-dimensional imaging unit.

Meanwhile, a Raman scattering spectrum has a Raman shift peak wavenumber corresponding to a specific functional group in the wavenumber range of 4000 $cm^{-1}$ to 100 $cm^{-1}$. FIG. 5A illustrates a Raman scattering spectrum of polystyrene as an example of a hydrocarbon contained in a waste resin. Characteristics peak shifts in the wavenumber range of 4000 $cm^{-1}$ to 100 $cm^{-1}$ are not uniform but uneven, and the wavenumber range is divided in the wavenumber direction. It is known to divide the Raman spectroscopy wavenumber range into three regions i.e., a fingerprint region (500 $cm^{-1}$ to 1800 $cm^{-1}$), a silent region, and a C-H stretch region (2800 $cm^{-1}$ to 3100 $cm^{-1}$) from low wavenumbers toward high wavenumbers. Useful peak shifts appear less frequently in the silent region (1800 $cm^{-1}$ to 2800 $cm^{-1}$) between the fingerprint region and the C-H stretch region than in the fingerprint region and the C-H stretch region on spectral identification.

Thus, the number of light detection elements corresponding to the silent region of the optical spectrum projected to the imaging units of the identification apparatuses discussed in BUNSEKI-KAGAKU Vol. 61, No. 12, pp. 1027-1032 (2012) and Japanese Patent Application Laid-Open No. 2019-105628 are not effectively used in material identification, and the use efficiency of the imaging unit is decreased as illustrated in FIG. 5B. In other words, the number of light detection elements corresponding to the silent region is ¼ to ⅖ the number of light detection elements corresponding to the entire region of the spectrum projected in the row direction, and therefore the spectral identification capacity is decreased by ¾ to ⅗.

SUMMARY OF THE INVENTION

The present invention is directed to an identification apparatus including a spectroscopic element situated to effectively disperse collected light and an imaging unit. Specifically, the present invention is directed to an identification apparatus that ensures a spectral resolution of a wavenumber band useful in identifying properties of a sample.

According to an aspect of the present invention, an identification apparatus includes a light collecting unit configured to collect scattered light from a sample, spectroscopic elements configured to disperse light from the light collecting unit, an imaging unit that includes a plurality of light detection elements arrayed in a row direction and a column direction and to which optical spectra from the spectroscopic elements are projected along the row direction, and an acquisition unit configured to acquire spectral information about the sample based on an output signal from the imaging unit. The optical spectra corresponding to the sample are projected to the imaging unit discontinuously in at least one of the row direction and the column direction.

Further features of the present invention will become apparent from the following description of exemplary embodiments with reference to the attached drawings.

BRIEF DESCRIPTION OF THE DRAWINGS

FIG. 5A is a diagram illustrating a Raman scattering spectrum of polystyrene.

FIG. 5B illustrates a projection of an optical spectrum to an imaging device according to a conventional technique.

DESCRIPTION OF THE EMBODIMENTS

Various exemplary embodiments of the present invention will now be described with reference to the drawings.

Figure 1:
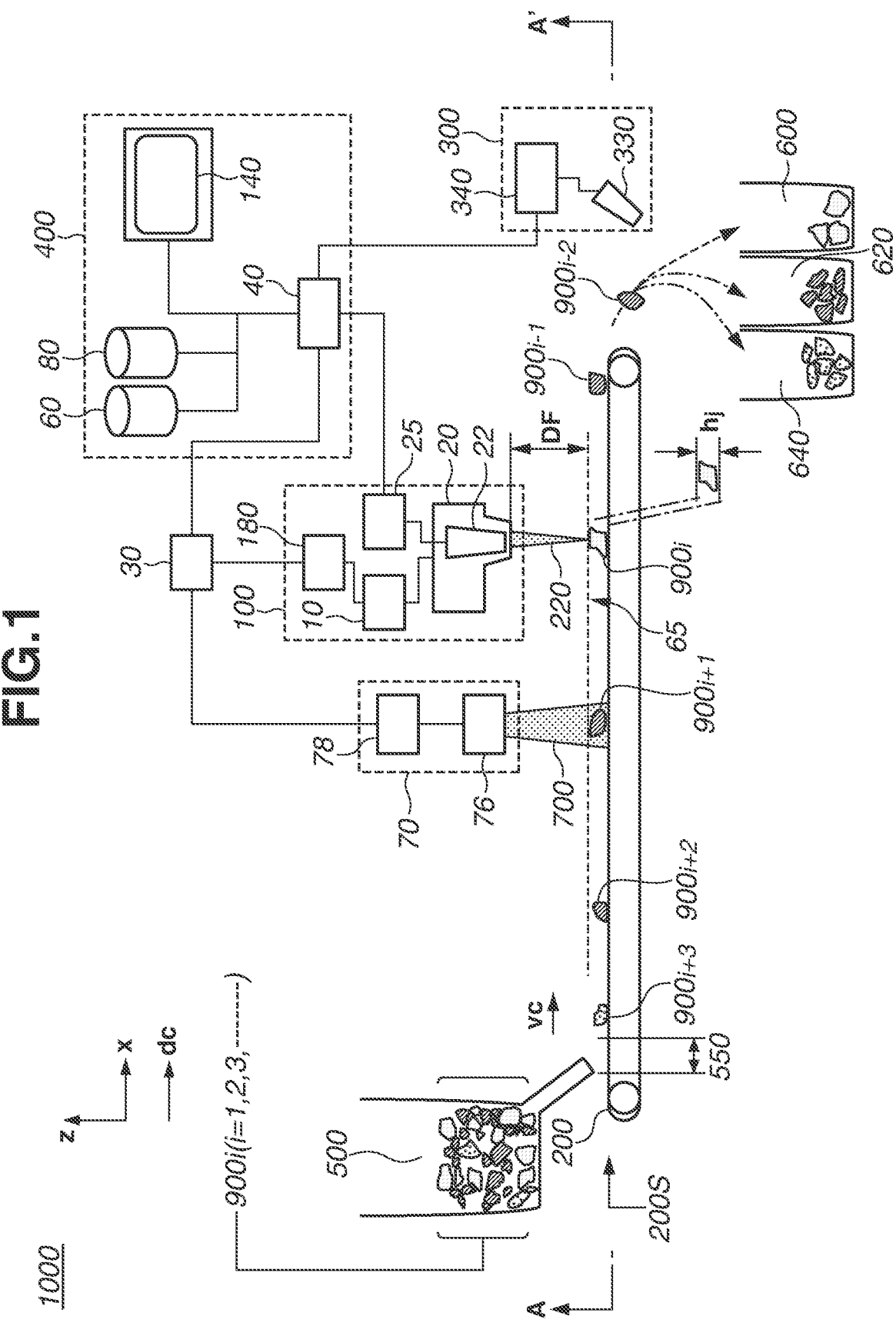
FIG. 1 is a diagram illustrating a schematic configuration of an identification apparatus according to a first exemplary embodiment.
Figure 2A:
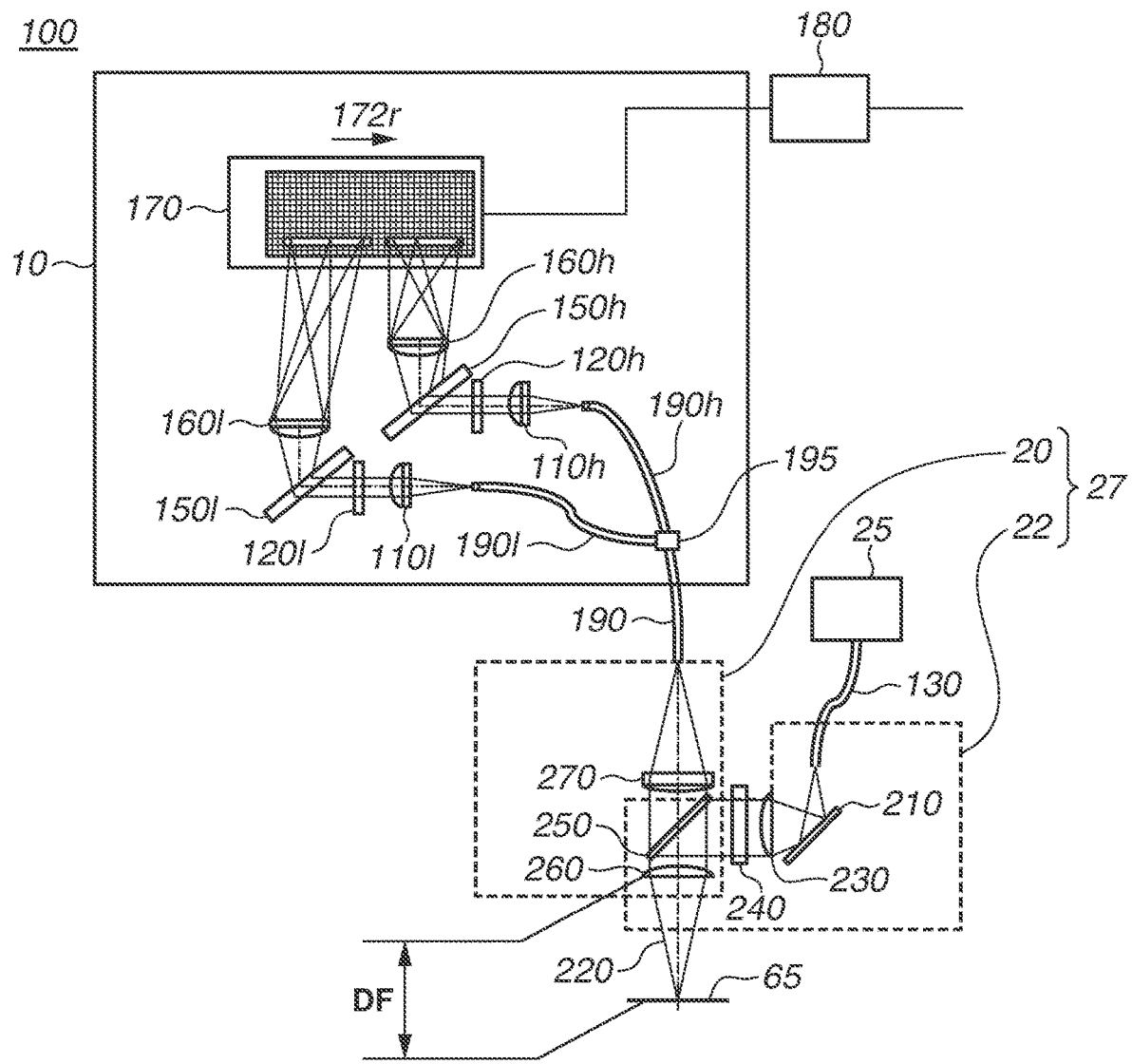
FIG. 2A is a block diagram illustrating a schematic configuration of a spectral information acquisition unit.
Figure 2B:
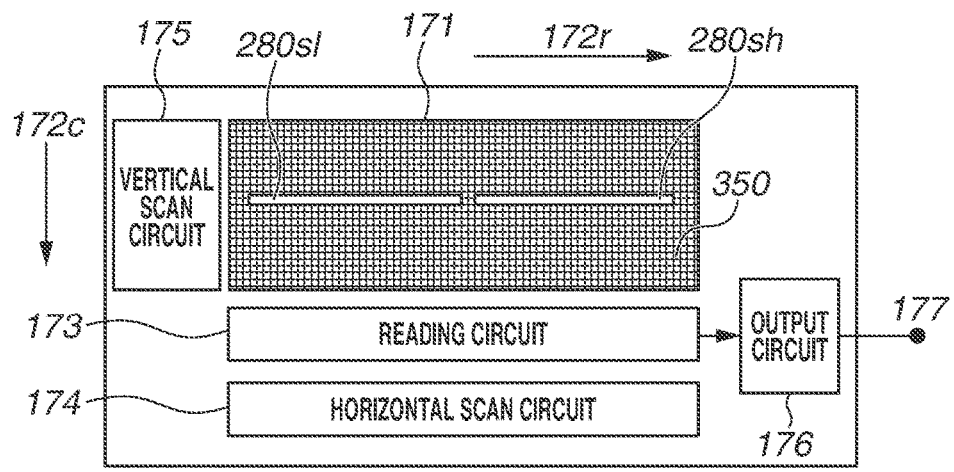
FIGS. 2B and 2C illustrate a projection of an optical spectrum to an imaging device according to the first exemplary embodiment.
Figure 2C:
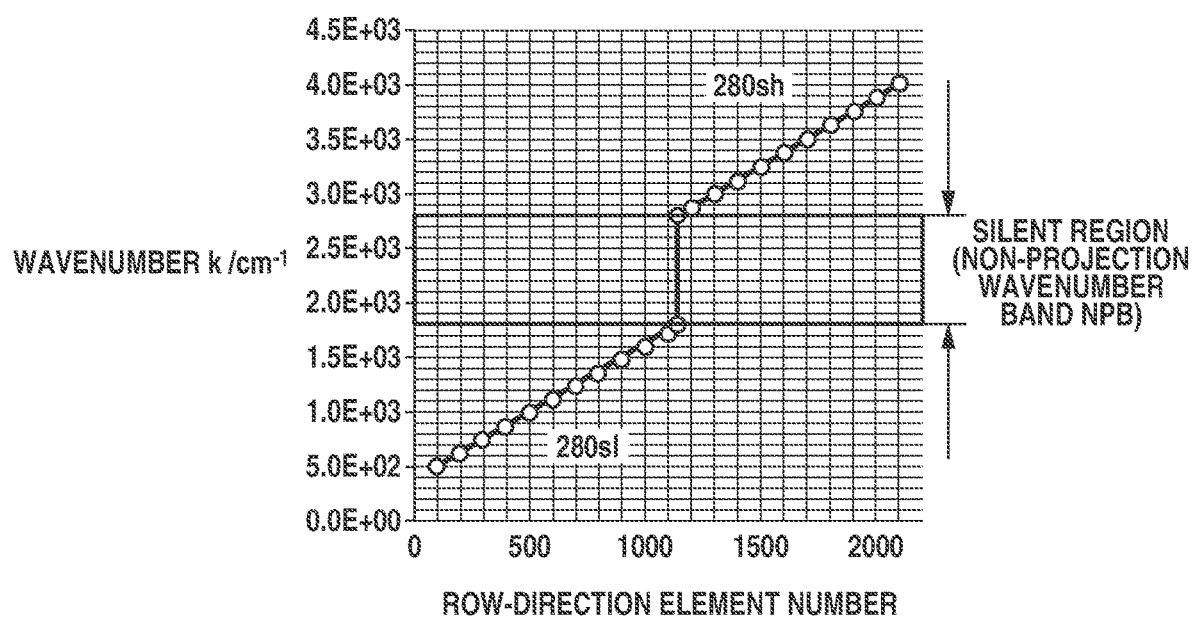

An identification apparatus according to a first exemplary embodiment will now be described with reference to FIGS. 1, 2A, 2B, and 2C. FIG. 1 is a diagram schematically illustrating a configuration of an identification apparatus 1000 according to the present exemplary embodiment. FIG. 2A is a detailed partial view illustrating a spectral information acquisition unit 100 of the identification apparatus 1000 illustrated in FIG. 1. FIG. 2B is a diagram illustrating a projection of optical spectra 280sl and 280sh to an imaging unit 170. FIG. 2C is a diagram illustrating a relationship between light detection element numbers in a row direction 172r of the imaging unit 170 and wavenumbers of optical spectra projected in the row direction 172r. The light detection element numbers are also referred to as "row direction addresses of light detection elements" or "row direction numbers of light detection elements".

In FIG. 1, a z-direction corresponds to a vertical direction and a gravity direction, an x-direction corresponds to a conveyance direction dc, a y-direction corresponds to a conveyance width direction dw, and an xy-plane corresponds to a horizontal surface. The conveyance width direction dw is parallel to a conveyance surface 200S and corresponds to a direction orthogonal to the conveyance direction dc.

(Identification Apparatus)

The identification apparatus 1000 includes an irradiation unit 22 as illustrated in FIG. 1. The irradiation unit 22 irradiates a sample 900i conveyed in the conveyance direction dc with irradiation light 220 to focus the irradiation light 220 on the sample 900i. The sample 900i is fed to a conveyance unit 200 by a feeder 500 and conveyed along the conveyance direction dc by the conveyance unit 200. The irradiation light 220 is also referred to as converged light 220 or primary light 220.

The identification apparatus 1000 includes a light collecting unit 20 corresponding to the irradiation unit 22 as illustrated in FIG. 1. The light collecting unit 20 collects scattered light from the sample 900i. The identification apparatus 1000 also includes an acquisition unit 30 as illustrated in FIG. 1A. The acquisition unit 30 acquires identification information for identifying properties of the sample 900i based on the light collected by the light collecting unit 20.

The identification apparatus 1000 also includes the conveyance unit 200 and a discrimination apparatus 300 situated downstream of the conveyance unit 200 in the conveyance direction dc, as illustrated in FIG. 1. The conveyance unit 200 includes a conveyer belt that conveys the sample 900i at a conveyance velocity vc in the x-direction.

A spectral information acquisition unit included in the identification apparatus 1000 and having a spectroscopic element and an imaging unit according to a feature of the present invention will now be described in detail with reference to FIG. 2A.

(Spectral Information Acquisition Unit)

The identification apparatus 1000 includes the spectral information acquisition unit 100 configured to acquire spectral information about light collected from the sample 900i. The spectral information acquisition unit 100 is a unit that acquires a Raman shift from a difference in wavenumber between Raman scattered light contained in secondary light from the sample 900i and excitation light contained in primary light.

The spectral information acquisition unit 100 includes the irradiation unit 22 and the light collecting unit 20 as illustrated in FIGS. 1 and 2A. The irradiation unit 22 irradiates the sample 900i with the irradiation light 220, and the light collecting unit 20 collects the secondary light from the sample 900i. The irradiation unit 22 and the light collecting unit 20 according to the present exemplary embodiment are situated on the same axis, and the irradiation unit 22 is optically coupled to a light source 25 including a laser light source via an optical fiber 130. The light collecting unit 20 is optically coupled to a spectral image acquisition unit 10 to enable the spectral information acquisition unit 100 to acquire optical information reflecting a material contained in the sample 900i.

(Light Collecting Unit)

FIG. 2A is a diagram schematically illustrating an example of a configuration of the spectral information acquisition unit 100. The spectral information acquisition unit 100 includes a light collecting unit 27 having the irradiation unit 22 and the light collecting unit 20. The irradiation unit 22 irradiates the sample 900i with light, and the light collecting unit 20 collects Raman scattered light from the sample 900i. The irradiation unit 22 and the light collecting unit 20 are situated on the same axis on the sample side (object side) when viewed from a dichroic mirror 250, and a positional deviation is less likely to occur between a center of an irradiation spot and a center of scattered light to be collected even in a case where an irradiated surface of the sample 900i has a difference in height or is tilted.

(Irradiation Unit)

The irradiation unit 22 is situated above the conveyance unit 200 and has a focal distance DF to form a focal plane 65 at a position at a predetermined distance from the conveyance surface 200S of the conveyer belt.

The irradiation unit 22 is situated to focus the irradiation light 220 on an upper side of the sample 900i to increase the scattering intensity of Raman scattered light, which is weaker by several orders of magnitude than Rayleigh scattered light. A unit including the irradiation unit 22 and the light source 25 is also referred to as an irradiation optical system.

The irradiation unit 22 includes an objective lens 260, the dichroic mirror 250, a collimator lens 230, a cylindrical lens 240, and a reflection mirror 210 as illustrated in FIG. 2A. The objective lens 260 employs a convex lens, a collimator lens, a concave lens, and/or a zoom lens.

Synthetic quartz can be used as a glass material for the collimator lens 230, the cylindrical lens 240, and the objective lens 260. The collimator lens 230, the cylindrical lens 240, and the objective lens 260 are irradiated with high-output light from a semiconductor laser 25, but use of synthetic quartz as a material for these glass lenses can reduce background components of fluorescence and Raman scattered light.

The objective lens 260 acts as a condenser lens that condenses light from the laser light source 25 to the sample 900i in the irradiation unit 22. The objective lens 260 forms the focal plane 65 at a focal distance DF from the objective lens 260, a focal point (focal spot) with a focal diameter φ (not illustrated), and a focal depth ΔDF correspondingly to a numerical aperture NA.

The collimator lens 230 and the cylindrical lens 240 reduce the spread of emitted light from the laser light source 25 and shape the light into parallel light. The cylindrical lens 240 can use another optical element for collimating such as an anamorphic prism pairs. Further, a wavelength filter such as a laser line filter can be provided at the position of a pupil surface of the irradiation unit 22. This improves wavelength characteristics of light with which the sample 900i is irradiated by the irradiation unit 22.

As illustrated in FIG. 2A, at least a portion of the irradiation unit 22 can be shared with the light collecting unit 20. Since the light collecting unit 20 and the irradiation unit 22 according to the present exemplary embodiment are situated on the same axis, the objective lens 260 and the dichroic mirror 250 are shared by the light collecting unit 20 and the irradiation unit 22.

(Light Source)

The light source 25 is a light source that emits excitation light to the irradiation unit 22 via the optical fiber 130. The irradiation optical system that disperses Raman scattered light uses a laser light source with a wavelength of 400 nm to 1100 nm as the light source 25. In Raman scattering, the excitation efficiency increases at shorter wavelengths, and fluorescence components to be a background decrease at longer wavelengths.

A wavelength selected as an excitation wavelength of a laser light source applied to the light source 25 is desirably a wavelength from which a difference in Raman shift between a target material and a non-target material is distinctively obtained, and there is a case where at least one of 532 nm, 633 nm, 780 nm, and 1064 nm is used. While use of the semiconductor laser 25 as a light source of the irradiation unit 22 is described herein, the light source is not limited to that described herein, and another laser light source such as a semiconductor excited solid-state laser or a gas laser can be used.

(Light Collecting Unit)

The light collecting unit 20 is situated above the conveyance surface 200S to collect the secondary light emitted from a top surface of the sample 900i conveyed by the conveyance unit 200. In other words, the light collecting unit 20 is situated above the conveyance unit 200 corresponding to an irradiation region of the irradiation light 220 emitted from the irradiation unit 22 to collect the secondary light from the top surface of the sample 900i conveyed through the irradiation region.

The light collecting unit 20 includes the objective lens 260, the dichroic mirror 250, an imaging lens 270, and an optical fiber 190. The objective lens 260 of the light collecting unit 20 includes a convex lens, a collimator lens, a concave lens, and/or a zoom lens as those included in the irradiation unit 22. The light collecting unit 20 may include a wavelength filter, such as a band-pass filter or a long-pass filter to reduce excitation light components contained in the primary light, in order to reduce unnecessary light in spectroscopic measurement.

The light collecting unit 20 employs an objective lens having a large numerical aperture to ensure light collection efficiency. An objective lens with a numerical aperture of 0.1 or more to 0.5 or less is employed as the objective lens 260 of the light collecting unit 20. More specifically, an objective lens B-270 manufactured by SCHOTT having an effective lens diameter of 25 mm, a focal distance of 20 mm, and a numerical aperture of 0.5 can be used as the objective lens 260.

(Spectral Image Acquisition Unit)

The spectral image acquisition unit 10 includes a branch portion 195, imaging lenses 110l and 110h, band-pass filters 120l and 120h, spectroscopic elements 150l and 150h, and the imaging unit 170 in this order from the light collecting unit 20 side as illustrated in FIG. 2A. In the present exemplary embodiment, the letters l (the lowercase letter of "L" of the alphabet) and h are added at the end of each reference numeral to indicate the low-wavenumber side and the high-wavenumber side, respectively. The spectroscopic elements 150l and 150h are situated to disperse light collected by the light collecting unit 20 through imaging lenses 160l and 160h and to project a continuous spectrum to the imaging unit 170 along a row or column direction of a light detection element array of the imaging unit 170.

The optical spectrum 280sl of low wavenumbers and the optical spectrum 280sh of high wavenumbers are projected to the imaging unit 170 along light detection elements 350 arrayed in the row direction 172r, according to the present exemplary embodiment as illustrated in FIGS. 2A and 2B. In other words, the optical spectrum 280sl of low wavenumbers and the optical spectrum 280sh of high wavenumbers are projected to the imaging unit 170 along the row direction 172r discontinuously with a non-projection band NPB between row-direction element numbers 1041 and 1042 as illustrated in FIG. 2C. The non-projection band NPB is set correspondingly to a silent region of 1800 $cm^{-1}$ to 2800 $cm^{-1}$. The non-projection band NPB is also referred to as "non-projection band" or "non-projection wavenumber range".

The non-projection band NPB is desirably set to a wavenumber range of 200 $cm^{-1}$ or higher, more desirably a wavenumber range of 500 $cm^{-1}$ or higher.

According to the present exemplary embodiment, an optical spectrum of high wavenumbers from 1800 $cm^{-1}$ to 4000 $cm^{-1}$ and an optical spectrum of low wavenumbers from 500 $cm^{-1}$ to 1800 $cm^{-1}$ in the 3500-$cm^{-1}$ wavenumber range of received light from 500 $cm^{-1}$ to 4000 $cm^{-1}$ excluding the non-projection band NPB of 1000 $cm^{-1}$ are projected to the imaging unit 170. Thus, a wavenumber width that can be divided by a single light detection element according to the present exemplary embodiment is reduced to 745/1040 at the low wavenumbers and 645/960 at the high wavenumbers compared to projections illustrated in FIGS. 5A and 5B according to a conventional technique, and the spectral resolution in the wavenumber direction is improved. The optical spectrum of the low wavenumbers ranging from 500 cm$^{-1}$ to 1800 cm$^{-1}$ and the optical spectrum of the high wavenumbers ranging from 1800 cm$^{-1}$ to 4000 cm$^{-1}$ are projected discontinuously from each other by arranging the spectroscopic element 150*l* for the low wavenumbers and the spectroscopic element 150*h* for the high wavenumbers are shifted in the row direction 172*r* of the imaging unit 170. In other words, the spectroscopic element 150*l* for low wavenumbers and the spectroscopic element 150*h* for high wavenumbers respectively project the plurality of optical spectra 280*sl* and 280*sh* having a different wavenumber range from each other to a plurality of regions of the imaging unit 170. In other words, the plurality of optical spectra 280*sl* and 280*sh* having a different wavenumber range from each other is projected to a plurality of regions of the imaging unit 170 with the non-projection band NPB, which is not projected to the imaging unit 170, between the optical spectra 280*sl* and 280*sh*.

According to a modified example of the present exemplary embodiment, exit ends of optical fibers 190*l* and 190*h* are arranged in parallel and shifted vertically on the sheet plane of FIG. 2A with respect to one of the spectroscopic elements 150*l* and 150*h*. With the configuration according to the modified example, optical spectra of low and high wavelengths are discontinuously projected to the imaging unit 170 along the row direction 172*r* from the one of the spectroscopic elements 150*l* and 150*h*. With the configuration according to the modified example, the other one of the spectroscopic elements 150*l* and 150*h*, the corresponding imaging lens 110*l* or 110*h*, the other one of the band-pass filters 120*l* and 120*h*, and the branch portion 195 can be omitted.

The spectroscopic elements 150*l* and 150*h* do not have to be the same spectroscopic element, and each can be optimized as needed based on a lattice period and a wavenumber band of a central wavelength to be projected in order to project spectral images of low and high wavelengths to a wide region on the imaging unit 170. In this case, the imaging unit 170 is situated at an optimum position in line with an individual emission angle of the spectroscopic elements 150*l* and 150*h* considering diffraction efficiency and wavenumber resolution.

(Imaging Unit)

The imaging unit 170 employs an imaging device, such as a charge-coupled device (CCD) image sensor or a complementary metal oxide semiconductor (CMOS) image sensor, with light detection elements arranged two-dimensionally. The plurality of light detection elements 350 of the imaging unit 170 according to the present exemplary embodiment is arranged in a matrix. In a case where the plurality of light detection elements 350 is arranged in a delta array, however, row and column directions are associated with two of three axes or are associated with a direction of one of the three axes and a combined direction of a combination of the remaining two axes. The identification apparatus 1000 identifies properties of the sample 900*i* while the conveyance unit 200 conveys the sample 900*i*, and the discrimination apparatus 300 discriminates the sample 900*i* based on the identification result. Thus, it is desirable to increase the conveyance velocity vc of the conveyance unit 200 in order to increase the throughput of the sorting processing by the identification apparatus 1000. The optical spectra 280*sl* and 280*sh* projected onto the imaging unit 170 are based on Raman scattered light generated from the sample 900*i* moving on the conveyance surface 200S. Thus, the optical spectra 280*sl* and 280*sh* are projected onto the imaging unit 170 while the conveyed sample 900*i* is in the irradiation region of the irradiation light 220 (the converged light 220) emitted from the irradiation unit 22. For example, in a case where the conveyance velocity vc of the conveyance unit 200 is 2 m/second and the length of the sample 900*i* in the conveyance direction dc is 10 mm, the time during which the imaging unit 170 can detect a spectral image formed by Raman scattered light from the sample 900*i* is 5 milliseconds or less. The imaging unit 170 is therefore required to have a high frame rate. An imaging unit with a high frame rate is a CMOS image sensor, and therefore the imaging unit 170 is desirably a CMOS image sensor.

As described above, the intensity of Raman scattered light from the sample 900*i* is significantly low, so that the intensity of incident light on each element of the light detection elements 350 of the imaging unit 170 is also significantly low. It is therefore desirable to use an imaging unit with high sensitivity to the wavenumber region where spectral images corresponding to the optical spectra 280*sl* and 280*sh* are acquired, as the imaging unit 170. In general, a rolling shutter image sensor has a simpler pixel structure and a higher aperture ratio than a global shutter image sensor, and photoelectric conversion elements can be enlarged, so that the sensitivity and the dynamic range can be increased. Furthermore, having a simple pixel structure, a rolling shutter image sensor has an advantage that the cost is lower than a global shutter image sensor. For the foregoing reasons, a rolling shutter CMOS image sensor is used as the imaging unit 170 according to the present exemplary embodiment.

The imaging unit 170 can employ a rolling reset type image sensor that sequentially resets each row of the array of the light detection elements 350. This increases the exposure time of each row of the array of the light detection elements 350 as long as possible, and the sensitivity increases.

The imaging unit 170 according to present exemplary embodiment includes a crop reading function of reading a specific row in a light receiving unit 171 including the light detection elements 350 arrayed two-dimensionally in the row direction 172*r* and a column direction 172*c*. Thus, in a case where a morphologic information acquisition unit 70 described below detects an arrival of the sample 900*i* at a light collectable region of the light collecting unit 20, the imaging unit 170 reads a specific row in the light receiving unit 171 corresponding to the light collecting unit 20.

The imaging unit 170 includes a reading circuit 173, a horizontal scan circuit 174, a vertical scan circuit 175, and an output circuit 176. The imaging unit 170 sequentially reads signals from a plurality of pixels arranged in a matrix shape row by row. The vertical scan circuit 175 selects a row in the light receiving unit 171 and drives the selected row. The reading circuit 173 reads signals output from the pixels of the row selected by the vertical scan circuit 175 and transfers the read signals to the output circuit 176 based on control by the horizontal scan circuit 174. This is how the reading in a main-scan direction (row direction) is performed. The row selected by the vertical scan circuit 175 is shifted, and the reading circuit 173 performs reading in the main-scan direction based on control by the horizontal scan circuit 174. The foregoing operations are repeated so that the selected row is shifted in a sub-scan direction (column direction), and thereby signals from the entire light receiving unit 171 are read. The read signals are output as output signals to a material information reference unit 180 through an output terminal 177 of the output circuit 176. The material information reference unit 180 is situated outside the imaging unit 170. At this time, the scanning in the main-scan direction is performed at high speed, and the scanning in the sub-scan direction is slower than the scanning in the main-scan direction.

The imaging lenses 110*l* and 110*h* changes, into parallel light, branch light transmitted through the optical fiber 190 from the light collecting unit 20 and through one of the optical fibers 190*l* and 190*h* from the branch portion 195. The optical fibers 190*l* and 190*h* are also referred to as branch light guide portions 190*l* and 190*h*. The band-pass filters 120*l* and 120*h* reduce the intensity of excitation light components contained in the collected light and transmit a portion of Raman scattered light components. The band-pass filters 120*l* and 120*h* have spectral transmission characteristics to attenuate Raman scattered light of high wavenumbers and Raman scattered light of low wavenumbers, respectively. The spectroscopic elements 150*l* and 150*h* disperse collected light to spread wavelength components in a fan-shaped form. The imaging lenses 160*l* and 160*h* project the light dispersed by the spectroscopic elements 150*l* and 150*h* onto the imaging unit 170. The spectroscopic elements 150*l* and 150*h* are transmissive diffractive gratings. Reflective diffractive gratings can also be used as the diffractive gratings. In this case, a spectroscopic element configuration employs a Rowland arrangement or a Czerny-Turner configuration. The spectroscopic elements 150*l* and 150*h* are also referred to as diffractive gratings 150*l* and 150*h*.

The imaging unit 170 acquires spectral information Si about the sample 900*i* considering a captured spectral image, photoelectric conversion characteristics of an image sensor of the imaging unit 170, and transmission characteristics of an optical system. In addition, the spectroscopic elements 150*l* and 150*h* can also acquire polarization information including circular dichroism and optical rotatory dispersion together with optical spectra.

(Material Information Reference Unit)

The spectral information acquisition unit 100 includes the material information reference unit 180, which acquires material information about the sample 900*i* based on the spectral information Si acquired by the spectral image acquisition unit 10. The material information reference unit 180 refers to a material database (not illustrated) storing Raman scattered light reference data and acquires material information Mi based on the similarity between the spectral information Si and reference data. The material information Mi identifies materials contained in the sample 900*i*. The spectral information acquisition unit 100 stores at least one of the spectral information Si and the material information Mi in a first storage unit 60 via an instruction unit 40 described below.

The material database that the material information reference unit 180 refers to can be stored on a local server of the identification apparatus 1000 or on a remote server that is accessible via the Internet or an intranet.

As described above, the spectral information acquisition unit 100 acquires the material information Mi about mixtures of, for example, materials, additives, and impurity components contained in the sample 900*i*.

(Morphologic Information Acquisition Unit)

The morphologic information acquisition unit 70 includes a camera 76 and an image processing unit 78, as illustrated in FIG. 1, and acquires morphologic information Fi about the sample 900*i*. The camera 76 is situated such that an imaging field of view 700 overlaps the conveyance unit 200. The image processing unit 78 processes an image of a sample captured by the camera 76. Similarly to the material information Mi, the morphologic information Fi is information about properties of the sample 900*i*.

The image processing unit 78 performs image processing including contrast and contour extraction, and acquires, for example, the length of each sample 900*i* in the conveyance direction dc, and the reflected color of each sample 900*i*, the shape of each sample 900*i*, and the mixing level of materials of each sample 900*i*. The image processing unit 78 is also referred to as an element that performs processing to acquire size information about each sample 900*i*. The morphologic information acquisition unit 70 can include a photo-interrupter (not illustrated) and a laser interferometer (not illustrated) in place of the camera 76. The morphologic information acquisition unit 70 is also referred to as an imaging unit. The morphologic information acquisition unit 70 is also an element selectively employed in the identification apparatus 1000.

(Acquisition Unit)

The acquisition unit 30 acquires identification information Di about whether the sample 900*i* is a target sample or a non-target sample based on the material information Mi or the spectral information Si acquired by the spectral information acquisition unit 100 and the morphologic information Fi acquired by the morphologic information acquisition unit 70 as illustrated in FIG. 1. The acquisition unit 30 acquires the identification information Di for each sample 900*i*. The acquisition unit 30 outputs the acquired identification information Di to the instruction unit 40.

In other words, the acquisition unit 30 identifies properties of the sample 900*i* based on a Raman spectrum contained in the secondary light of the light collected by the light collecting unit 20. In other words, the acquisition unit 30 according to the present exemplary embodiment identifies properties of each sample 900*i* based on the image of the sample acquired from the camera 76 and the Raman spectrum contained in the secondary light of the light collected by the light collecting unit 20.

The spectral information acquisition unit 100 and the morphologic information acquisition unit 70 according to the present exemplary embodiment can be replaced with a hyperspectral camera or a multiband camera capable of acquiring the morphologic information Fi and the spectral information Si from a captured image, according to a modified form. Specifically, an identification apparatus (not illustrated) according to the modified form includes a detection system that acquires multi-dimensional data from which material information and morphologic information are readable.

(Control Unit)

The identification apparatus 1000 includes a control unit 400 including the instruction unit 40, a second storage unit 80, and the first storage unit 60. The instruction unit 40 controls the discrimination operation of the discrimination apparatus 300 based on the properties of each sample 900*i*. The second storage unit 80 stores a control condition of the discrimination operation. The first storage unit 60 stores the properties of each sample 900*i*. The control unit 400 includes a display unit 140 configured to provide a graphical user interface (GUI) via which a user can designate the control condition. The display unit 140 may display information acquired by the acquisition unit 30.

(Storage Unit)

The first storage unit 60 is configured to store, for each sample 900*i*, the identification information Di, the material information Mi, the spectral information Si, and the morphologic information Fi in association with a timing tp of the passing of the sample 900*i* through the irradiation light 220.

On the other hand, the second storage unit 80 is configured to store a control condition for controlling an intensity Is of the discrimination operation of the discrimination apparatus 300 that corresponds to the identification information Di for each sample 900i. Forms of the control condition include a table for reference, an algebraically-expressed general formula, and machine-learned statistical information.

(Instruction Unit)

The instruction unit 40 estimates the time of the passing of the sample 900i through a processing region where the discrimination apparatus 300 performs discrimination processing on the sample 900i based on the materials and size of each sample 900i based on the identification information Di from the acquisition unit 30, and generates an instruction to control the discrimination operation of the discrimination apparatus 300. The time of the passing of the sample 900i through the processing region can be estimated based on at least one of a signal from the morphologic information acquisition unit 70, a signal from the spectral information acquisition unit 100, and a signal from a sample sensor (not illustrated) of the conveyance unit 200.

(Discrimination Apparatus)

The discrimination apparatus 300 includes an air nozzle 330 and a discrimination control unit 340 as illustrated in FIG. 1. The air nozzle 330 discharges compressed air for a predetermined discharge time, at a predetermined discharge velocity, and at a predetermined discharge flow rate. The discrimination control unit 340 controls a solenoid valve (not illustrated) of the air nozzle 330. The discrimination control unit 340 receives a control signal from the instruction unit 40 of the identification apparatus 1000. The discrimination operation of the discrimination apparatus 300 according to the present exemplary embodiment includes an operation of discharging a fluid. The fluid to be discharged by the discharge operation includes air, dry nitrogen, inert gas such as a noble gas, liquid, and gas-liquid mixture fluid (aerosol). The discrimination apparatus 300 collects the sample 900i into a target collection basket 620 and a non-target collection basket 600 or 640 according to the properties of the sample 900i based on the control signal from the instruction unit 40.

A discharge apparatus of the discrimination apparatus 300 that discharges a fluid can be replaced with a flap gate that opens and closes at a predetermined angular velocity or a shutter that opens and closes at a predetermined velocity. The morphologic information acquisition unit 70, the spectral information acquisition unit 100, the discrimination apparatus 300, and components thereof included in the identification apparatus 1000 are situated in parallel at different positions in the conveyance width direction dw of the conveyance unit 200 for system consolidation and high-speed processing. The discrimination apparatus 300 can be considered as an element of the identification apparatus 1000 and is sometimes referred to as a discrimination unit 300.

(Conveyance Unit)

The conveyance unit 200 is a conveyance unit that conveys the plurality of samples 900i (i=1, 2, . . . ) fed sequentially from the feeder 500 at the predetermined conveyance velocity vc in the conveyance direction dc (the x-direction illustrated in FIG. 1). The conveyance unit 200 and the feeder 500 form a conveyance unit that conveys the sample 900i.

The conveyance unit 200 according to the present exemplary embodiment includes the conveyer belt that conveys the sample 900i fed from the feeder 500 in the conveyance direction dc at the velocity vc linearly on the conveyance surface 200S. The conveyance unit 200 can be replaced with a turntable feeder that externally conveys a sample spirally, a vibrating feeder equipped with a vibration generator that moves a sample in a predetermined direction, or a conveyer roller including a plurality of rollers, according to a modified example.

The conveyance unit 200 moves the sample 900i such that the sample 900i passes through the imaging field of view 700 of the camera 76. Thus, the conveyance unit 200 is also referred to as a placement portion 200 with respect to the morphologic information acquisition unit 70. Similarly, the conveyance unit 200 moves the sample 900i such that the sample 900i passes through an effective light collection region (not illustrated) of the light collecting unit 20. Thus, the conveyance unit 200 is also referred to as the placement portion 200 with respect to the light collecting unit 20.

According to the present exemplary embodiment, the conveyance velocity vc of the conveyance unit 200 that is 0.1 m/s to 5 m/s is applicable in a case of the conveyer belt.

Further, a case where the classifying processing for filtering the shape and size of the sample 900i is performed as the preprocessing of the feeding by the feeder 500 is also a modified form of the identification method using the identification apparatus 1000 according to the present exemplary embodiment. A vibrating conveyer, a vibrating sieving machine, or a crushed grain checking machine is used as a unit that performs preprocessing.

An identification apparatus according to a second exemplary embodiment will now be described with reference to FIGS. 3A and 3B. FIG. 3B is a diagram illustrating a relationship between the light detection element numbers of light detection elements arrayed in the row direction 172r of the imaging unit 170 according to the present exemplary embodiment and the wavenumbers of optical spectra projected in the row direction 172r.

Figure 3A:
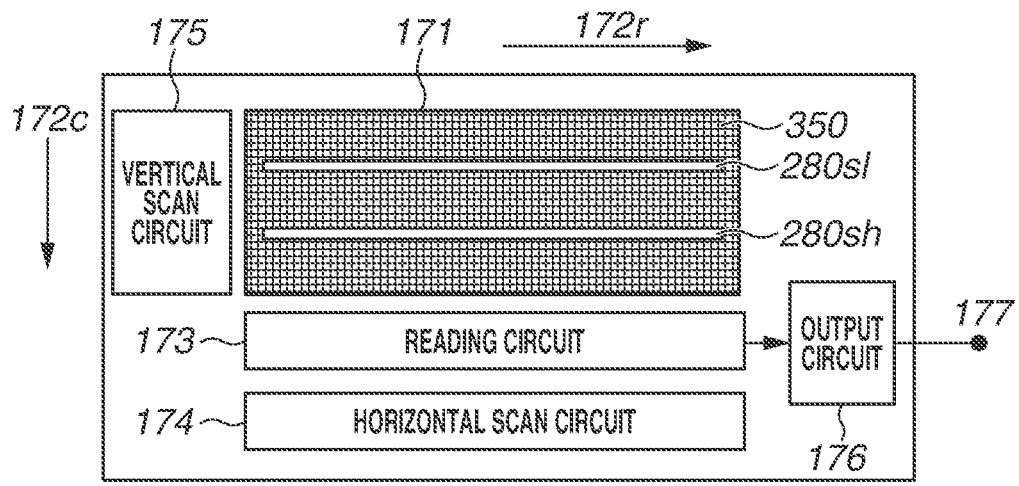
FIGS. 3A and 3B are diagrams illustrating a projection of an optical spectrum to an imaging device according to a second exemplary embodiment.
Figure 3B:
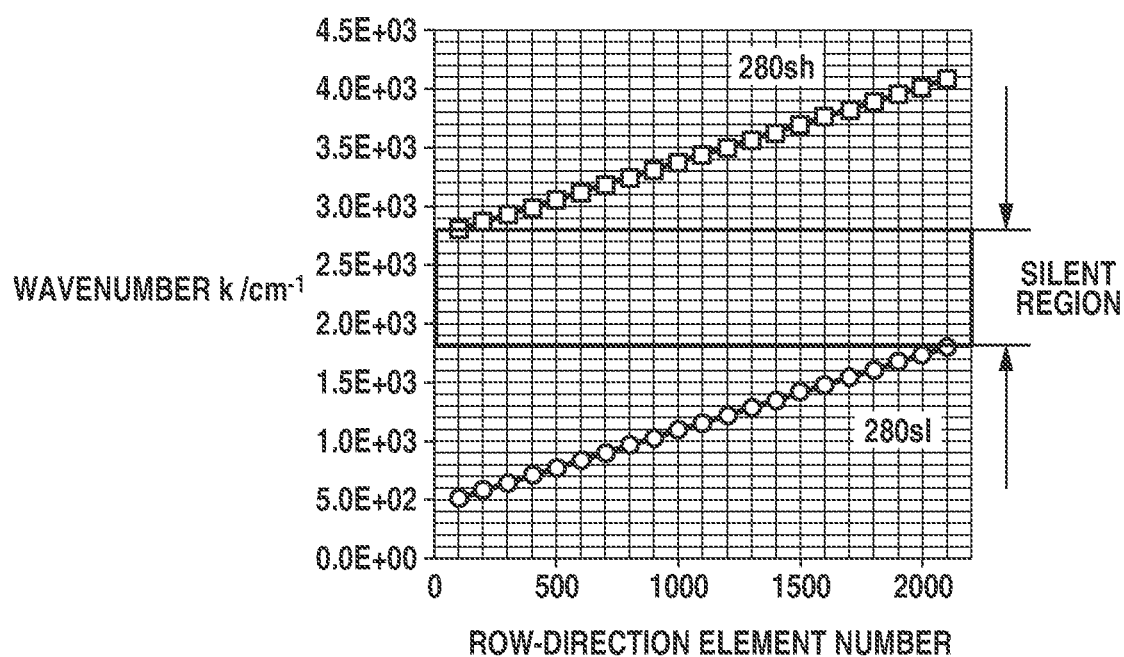

The identification apparatus according to the present exemplary embodiment is different from the identification apparatus 1000 according to the first exemplary embodiment in that the optical spectra 280sl and 280sh are projected to different positions on the imaging unit 170 in the row direction 172r and the column direction 172c as illustrated in FIG. 3A. Specifically, the present exemplary embodiment and the first exemplary embodiment are different in the directions of discontinuous projections of the optical spectra 280sl and 280sh to the imaging unit 170.

The identification apparatus according to the present exemplary embodiment is similar to the first exemplary embodiment in that the spectral image acquisition unit 10 includes two sets of spectroscopic elements 150l and 150h with respect to one imaging unit 170, whereas the present exemplary embodiment is different from the first exemplary embodiment in the arrangement of the spectroscopic elements 150l and 150h with respect to the imaging unit 170. According to the first exemplary embodiment, the spectroscopic elements 150l and 150h are shifted in the row direction 172r. According to the second exemplary embodiment, the spectroscopic elements 150l and 150h are shifted in the column direction 172c (not illustrated).

According to the present exemplary embodiment, the optical spectrum 280sl of low wavenumbers and the optical spectrum 280sh of high wavenumbers are projected to the light receiving unit 171 of the imaging unit 170 along the light detection elements 350 arrayed in the row direction 172r as illustrated in FIG. 3A. The optical spectrum 280sl of low wavenumbers and the optical spectrum 280sh of high wavenumbers are projected to the imaging unit 170 with the non-projection band NPB between the optical spectra 280sl and 280sh in the column direction 172c as illustrated in FIG. 3B. The optical spectrum 280sl of low wavenumbers and the optical spectrum 280sh of high wavenumbers are projected correspondingly to the light detection elements 350 corresponding to element numbers 101 to 2101 along the row direction 172r. The non-projection band NPB is set correspondingly to the silent region of 1800 cm$^{-1}$ to 2800 cm$^{-1}$ as described in the first exemplary embodiment.

According to the present exemplary embodiment, the optical spectra 280sl and 280sh of the low-wavenumber band of 500 cm$^{-1}$ to 1800 cm$^{-1}$ and the high-wavenumber band of 1800 cm$^{-1}$ to 4000 cm$^{-1}$ excluding the non-projection band NPB of 1000 cm$^{-1}$ are shifted in the column direction 172c and projected to the imaging unit 170. Thus, a wavenumber width that can be divided by a single light detection element according to the present exemplary embodiment is reduced to 745/2000 at the low wavenumbers and 645/2000 at the high wavenumbers compared to projections illustrated in FIGS. 5A and 5B according to a conventional technique, and the spectral resolution in the wavenumber direction is improved.

Figure 4A:
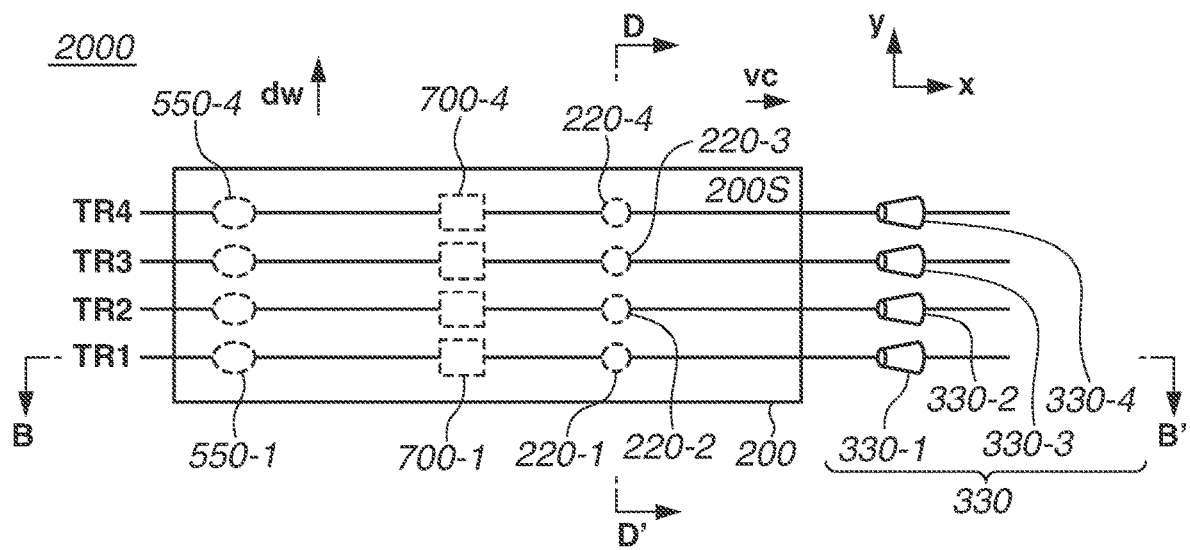
FIG. 4A is a diagram illustrating a schematic configuration of an identification apparatus.
Figure 4B:
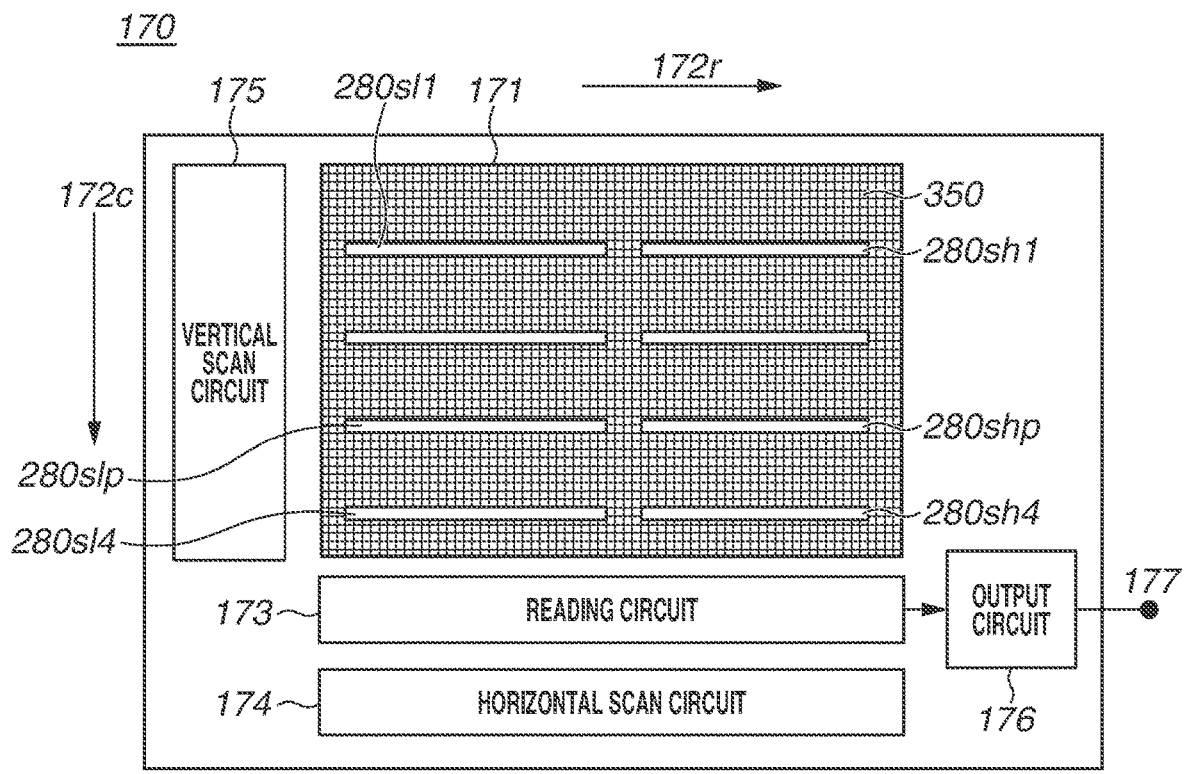
FIG. 4B illustrates a projection of an optical spectrum to an imaging device according to a third exemplary embodiment.

An identification apparatus according to a third exemplary embodiment will now be described with reference to FIGS. 4A and 4B. FIG. 4A is a diagram illustrating the conveyance unit 200 and a plurality of conveyance tracks TR-p (p=1 to 4) that are a main portion according to the third exemplary embodiment. FIG. 4A corresponds to a diagram illustrating a projection of a light collecting optical system and a discrimination apparatus of an identification apparatus 2000 to a plane A-A' illustrated in FIG. 1 as a projection plane. A cross section B-B' in FIG. 4A corresponds to the schematic configuration diagram illustrated in FIG. 1.

(Identification Apparatus)

The identification apparatus 2000 illustrated in FIG. 4A is different from the identification apparatus 1000 illustrated in FIG. 1 in that four imaging fields 700-p of the camera 76, four irradiation spots from the irradiation unit 22-p, and four air nozzles 330-p of the discrimination apparatus 300 are arranged in the conveyance width direction dw. The identification apparatus 2000 is a multi-column identification apparatus including a plurality of units for identification arranged in parallel at different positions in the conveyance width direction dw intersecting with the conveyance direction dc. The identification apparatus 2000 realizes system consolidation and high-speed identification processing compared to those of the identification apparatus 1000.

The identification apparatus 2000 includes four conveyance tracks TRp (p=1 to 4) defined by feeding regions 550-p (p=1 to 4) from the feeder 500. The identification apparatus 2000 includes the imaging fields 700-p, irradiation spots 220-p of the primary light, and air nozzles 300-p arranged in series correspondingly to the respective tracks TRp.

In forming a multi-row identification apparatus, elements to be situated at different positions in the conveyance width direction dw of the conveyance unit 200 can be situated independently or can be arrayed. The identification apparatus 2000 includes a feeder 500A and a multi-discrimination apparatus (not illustrated). An air supply port of the feeder 500A is arrayed. The air nozzles 300-p of the multi-discrimination apparatus are a multi-nozzle.

According to the present exemplary embodiment, light collected from the irradiation spot 220-p of the primary light corresponding to the conveyance track TRp (p=1 to 4) is guided to an optical fiber (light guide portion) (not illustrated) and a spectroscopic element set 150-p including a spectroscopic elements 150l-p and 150h-p. The spectroscopic elements 150l-p and 150h-p are shared by the plurality of conveyance tracks TRp (p=1 to 4), and thus the identification apparatus 2000 includes one for each. In contrast, the light collecting optical system includes four low-wavenumber band-pass filters, four high-wavenumber band-pass filters, four low-wavenumber imaging lenses, four high-wavenumber imaging lenses, four low-wavenumber optical fibers, and four high-wavenumber optical fibers correspondingly to the number of rows p, which is four. Respective exit ends of the plurality of low-wavenumber optical fibers and the high-wavenumber optical fibers according to the present exemplary embodiment are arrayed at predetermined intervals in one line in the vertical direction of FIG. 2A to form a one-dimensional exit end array. The exit end array with the exit ends arrayed in the vertical direction of FIG. 2A is situated in front of each of the imaging lenses 110l and 110h, and thereby optical spectra 280slp and 280slh corresponding to the conveyance track TRp are projected with a space in the column direction 172c. The spectroscopic elements 150l-p and 150h-p are shifted along the row direction 172r and projected in the imaging unit 170 as described in the first exemplary embodiment. The low-wavenumber band of 500 cm$^{-1}$ to 1800 cm$^{-1}$ and the high-wavenumber band of 2800 cm$^{-1}$ to 4000 cm$^{-1}$ that are respectively projected from the spectroscopic elements 150l-p and 150h-p are discontinuously projected to the imaging unit 170 with the non-projection band NPB therebetween as described in the first exemplary embodiment.

A wavenumber width that can be divided by a single light detection element according to the present exemplary embodiment is therefore reduced to 745/1040 at the low wavenumbers and 645/960 at the high wavenumbers compared to the conventional technique illustrated in FIGS. 5A and 5B, similarly to the first exemplary embodiment. According to the present exemplary embodiment, the spectral resolution of optical spectra 280sl1 to 280sl4 of low wavenumbers and optical spectra 280sh1 to 280sh4 of high wavenumbers in the wavenumber direction is improved compared to the conventional technique illustrated in FIGS. 5A and 5B, similarly to the first exemplary embodiment. According to a modified form, one of the exit end arrays according to the present exemplary embodiment can be juxtaposed with one spectroscopic element in the vertical direction of FIG. 2A as described in the first exemplary embodiment. According to the modified form, one spectroscopic element can discontinuously project the optical spectra 280slp and 280shp in the row direction 172r. According to the modified form, the exit ends can be arranged in the vertical direction of FIG. 2A to form a two-dimensional array. In the present specification, the term "optical spectrum" refers to an intensity distribution of diffraction light projected in the fan-shaped form from the spectroscopic element for each wavenumber, and the term "optical spectrum" may be used to also refer to a spatial spread of diffraction light and a spectral image captured by the imaging unit.

The present invention provides an identification apparatus including a spectroscopic element situated to effectively disperse collected light and an imaging unit. In other words, the present invention provides an identification apparatus that ensures a spectral resolution of a wavenumber band useful in identifying properties of a sample.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-180169, filed Oct. 28, 2020, which is hereby incorporated by reference herein in its entirety.

What is claimed is:

1. An identification apparatus comprising:
   one or more light collecting units configured to collect scattered light from one or more samples;
   one or more spectroscopic elements configured to disperse light from the light collecting units;
   an imaging unit that includes a plurality of light detection elements arrayed in a row direction and a column direction and to which optical spectra from the spectroscopic elements are projected along the row direction; and
   an acquisition unit configured to acquire spectral information about the samples based on an output signal from the imaging unit,
   wherein the optical spectra corresponding to the samples is projected to the imaging unit discontinuously in at least one of the row direction and the column direction.

2. The identification apparatus according to claim 1, wherein a plurality of the spectroscopic elements is provided with respect to the imaging unit.

3. The identification apparatus according to claim 1, wherein a plurality of the spectroscopic elements is provided with respect to the imaging unit to project the optical spectra corresponding to the samples to different positions in the row direction or the column direction.

4. The identification apparatus according to claim 2, further comprising:
   a branch portion configured to divide the light from the light collecting units corresponding to the plurality of the spectroscopic elements; and
   a plurality of branch light guide portions configured to guide the plurality of pieces of divided light from the branch portion to the plurality of spectroscopic elements.

5. The identification apparatus according to claim 2, further comprising:
   a plurality of the light collecting units; and
   a plurality of light guide portions configured to guide a plurality of pieces of light collected by the plurality of the light collecting units to the plurality of the spectroscopic elements.

6. The identification apparatus according to claim 2, wherein the plurality of the spectroscopic elements projects a plurality of optical spectra having a different wavenumber range from each other to a plurality of portions of the imaging unit.

7. The identification apparatus according to claim 6, wherein the plurality of optical spectra having the different wavenumber range from each other is projected to the plurality of portions of the imaging unit with a non-projection band that is not projected to the imaging unit therebetween.

8. The identification apparatus according to claim 7, wherein the non-projection band is a wavenumber range of 200 $cm^{-1}$ or higher.

9. The identification apparatus according to claim 7, wherein the non-projection band is a wavenumber range of 500 $cm^{-1}$ or higher.

10. The identification apparatus according to claim 1, wherein the acquisition unit acquires, as the spectral information, a plurality of the output signals corresponding to the samples in association with a wavenumber direction.

11. The identification apparatus according to claim 1, wherein the light collecting units collect Raman scattered light from the samples.

12. The identification apparatus according to claim 11, further comprising a placement portion where the samples are placed in an effective light collection region.

13. The identification apparatus according to claim 12, wherein the placement portion is configured to move the samples in a predetermined direction.

14. The identification apparatus according to claim 13, further comprising a discrimination unit situated downstream of the light collecting units in the predetermined direction and configured to sort a plurality of the samples.

15. The identification apparatus according to claim 14, wherein the acquisition unit controls a discrimination operation of the discrimination unit based on the spectral information.

* * * * *